(12) United States Patent
Rajoria

(10) Patent No.: US 6,790,419 B1
(45) Date of Patent: Sep. 14, 2004

(54) PURIFICATION OF GASEOUS INORGANIC HALIDE

(75) Inventor: Dalbir S. Rajoria, Glen Gardner, NJ (US)

(73) Assignee: Honeywell Intellectual Properties Inc., Morristown, NJ (US)

( * ) Notice: Subject to any disclaimer, the term of this patent is extended or adjusted under 35 U.S.C. 154(b) by 0 days.

(21) Appl. No.: 09/592,030

(22) Filed: Jun. 12, 2000

Related U.S. Application Data

(60) Provisional application No. 60/138,924, filed on Jun. 11, 1999.

(51) Int. Cl.[7] ............................................. C01B 35/06
(52) U.S. Cl. .................. 423/210; 423/240 S; 423/293; 423/292; 423/301; 423/462; 423/489
(58) Field of Search ................................ 423/293, 210, 423/240 R, 240 S, 341, 342, 301, 462, 489, 491, 292

(56) References Cited

U.S. PATENT DOCUMENTS

| | | |
|---|---|---|
| 2,148,514 A | 2/1939 | Swinehart |
| 2,196,907 A | 4/1940 | Swinehart |
| 2,999,736 A | 9/1961 | Shalit |
| 3,143,402 A | 8/1964 | Hervert et al. |
| 3,625,651 A | 12/1971 | Massonne et al. |
| 3,859,417 A | 1/1975 | Teller |
| 3,872,214 A * | 3/1975 | Kratel et al. ................ 423/240 |
| 3,935,294 A | 1/1976 | Teller |
| 4,024,221 A * | 5/1977 | Becker et al. ............... 423/292 |
| 4,263,467 A | 4/1981 | Madgavkar et al. |
| 4,446,120 A * | 5/1984 | Schmidt et al. ............. 423/350 |
| 4,457,901 A | 7/1984 | Kitsugi et al. |
| 4,714,604 A | 12/1987 | Olson |
| 4,755,370 A | 7/1988 | Kray et al. |
| 4,828,814 A * | 5/1989 | Sanjurjo et al. ............ 423/290 |
| 4,943,423 A * | 7/1990 | Evans et al. ................ 423/293 |
| 4,965,055 A | 10/1990 | Nordquist, Jr. et al. |
| 5,242,670 A | 9/1993 | Gehringer |
| 5,309,064 A * | 5/1994 | Armini ................... 315/111.81 |
| 5,371,052 A | 12/1994 | Kawamura et al. |
| 5,378,444 A | 1/1995 | Akita et al. |
| 5,597,540 A | 1/1997 | Akita et al. |
| 5,756,060 A | 5/1998 | Otsuka et al. |
| 5,882,615 A | 3/1999 | Fukuda et al. |
| 6,165,434 A * | 12/2000 | Rajoria ................... 423/240 S |

FOREIGN PATENT DOCUMENTS

| | | |
|---|---|---|
| DE | 3700244 | 7/1988 |
| EP | 546464 | 6/1993 |
| EP | 0662339 | 7/1995 |
| EP | 0742191 | 11/1996 |
| EP | 764458 | 3/1997 |
| EP | 792681 | 9/1997 |
| JP | 9-099216 | 4/1997 |
| JP | 9-234337 | 9/1997 |

* cited by examiner

Primary Examiner—Ngoc-Yen Nguyen

(57) ABSTRACT

The present invention provides an apparatus and method for the purification of gaseous inorganic halides utilizing a reactive metal and molecular sieves to remove impurities.

40 Claims, 1 Drawing Sheet

PURIFICATION OF GASEOUS INORGANIC HALIDE

CROSS-REFERENCE TO RELATED APPLICATION

The present application claims priority from the provisional patent application No. 60/138,924 filed Jun. 11, 1999.

FIELD OF THE INVENTION

The present invention relates to the purification of gaseous inorganic halides.

BACKGROUND OF THE INVENTION

Gaseous inorganic halides have widespread commercial applications. Such compounds have been known in the chemical arts for many years. These compounds are widely used as catalysts in polymers, pharmaceuticals, fine chemical synthesis and in the manufacture of electronic and semiconductor devices. Boron trifluoride, in particular, is used in the electronics industry for ion implantation and as a p-type dopant for semiconductor devices. Due to the purity requirements in many of the above applications, particularly in the electronics and semiconductor fields, there is an ever increasing need for ultra high purity gaseous inorganic halide compounds.

Most gaseous inorganic halide compounds are highly reactive to air and water and therefore must be handled in air-free, inert atmospheres. The manufacturing and purification of these compounds can be extremely difficult due to this high reactivity. A particular gaseous inorganic halide of commercial interest is boron trifluoride. Boron trifluoride is a strong Lewis acid that complexes with water, polar organic solvents, and other compounds having at least one unshared pair of electrons. The synthesis of boron trifluoride has been disclosed in U.S. Pat. Nos. 2,148,514 and 2,196,907. Boron trifluoride is a colorless gas which forms dense white fumes in moist air. It has a boiling point of −100° C., a melting point of −127° C. and like many inorganic halides it is extremely corrosive. Commercially available boron trifluoride typically has a purity of 99.7%. The major impurities are air, at 4,000 to 1,700 parts per million (PPM) and silicon halide (as silicon tetrafluoride) at 300 to 50 PPM. Other impurities present as artifacts of the manufacturing process include sulfate (10 PPM), hydrogen fluoride (25 PPM), hydrogen chloride (10 PPM), sulfur dioxide and boron trifluoride dihydrate are found in trace amounts. While these amounts are typical, the purity profile of any single lot of gaseous inorganic halide, particularly boron trifluoride, may vary.

Generally, boron trifluoride is purified through either distillation or adsorption on zeolites to remove some contaminants. Using these techniques, atmospheric gases such as nitrogen, oxygen and carbon dioxide can be reduced to concentrations of 10–20 PPM. However, other impurities listed above still remain. Therefore, a purification means is needed to remove most of the remaining impurities from gaseous inorganic halides and in particular boron trifluoride so that the concentration of the total impurities is reduced to less than about 20 PPM, a concentration suitable for use in electronic and semiconductor applications. It should be noted however that the purified gas provided by the present invention may be used in any application where high purity gas is necessary.

The present invention provides an improved purification method for gaseous inorganic halides and in particular boron trifluoride. Preferred processes according to the present invention can meet the needs and demands of today's electronic and semiconductor needs. Preferred processes according to the present invention specifically provides a method of reducing the total contaminant concentration to less than 20 PPM. The present invention also provides an apparatus for practicing the purification method.

SUMMARY OF THE INVENTION

The present invention generally provides an apparatus and a method of purifying gaseous inorganic halide compounds. Specifically, the present invention involves a process whereby the crude, or unpurified gaseous inorganic halide is contacted with a material capable of reacting and/or adsorbing impurities thereby reducing the same.

One aspect of this invention provides a process to reduce or eliminate impurities in gaseous inorganic halides to concentrations acceptable for use in high purity applications such as electronic and semiconductor devices. This purification is achieved by contacting the gaseous inorganic halide with a reactive substance. In a preferred embodiment of the invention, the reactive substance is a metal. The reactive metal is finely divided or otherwise provided in a form having a high surface area such as shot, foil, sheets, granules or powders. The reactive metal may also be plated or deposited onto or into an inert support. In another preferred embodiment, the reactive metal is packed in a column such that the crude gas is allowed to pass through and contact the metal. In yet another preferred embodiment of the present invention, the metal is provided in a powdered or pelletized form and contained in a fluidized bed such that the crude gaseous inorganic halide material is allowed to pass through thereby contacting the metal and thus react and/or adsorb impurities.

In another aspect of the present invention, the reactive metal used is preferably an alkaline metal, alkaline earth metal or an alloy of such metal. In a preferred embodiment of the present invention, the reactive metal selected is lithium or calcium. In yet another preferred embodiment of the present invention, the reactive metal selected may be an alloy of lithium or calcium combined with Group III or Group IV elements, and preferably one or more of the following elements: silicon, aluminum, germanium, boron and calcium. In another preferred embodiment of the invention, the gaseous inorganic halide is contacted with a reactive metal at a temperature above room temperature. (Room temperature is defined as any ambient temperature between about 20° C. to about 28° C.) In another preferred embodiment of the invention, the reactive metal is heated to a temperature below that of its melting point. In another preferred embodiment of the present invention, the contact time, or residence time, of the gas on the reactive metal is preferably between 30 seconds and 30 minutes, depending on other variables such as the reactor size and shape, the reactive metal used, the inorganic halide used and its purity.

In another aspect of the present invention, a method is provided whereby the crude gaseous inorganic halide is purified by contact with, or distillation over, an adsorbent material prior to being contacted with the reactive metal. In a preferred embodiment of the present invention, the adsorbent material can be molecular sieves. In an even more preferred embodiment of the present invention, 5A molecular sieves are used to contact the crude gaseous inorganic halide prior to contacting the reactive metal.

In another aspect of the present invention, the crude gaseous inorganic halide is distilled. In one preferred embodiment of the present invention, the inorganic halide may be distilled in the absence of any adsorbant or reactive substance. In another preferred embodiment of the present invention, the distillation of the crude inorganic halide is performed prior to, during or after it is contacted with either the molecular sieves or the reactive metal. In a preferred embodiment of the present invention, the distillation step preferably includes cryogenically condensing the gaseous inorganic halide at a temperature at or below its melting point followed by evacuation or pumping off the uncondensed gases. In yet another aspect of the present invention, the gaseous inorganic halide purified may be $BF_3$, $BCl_3$ $SiF_4$, $GeF_4$, $PF_3$, $PF_5$, $AsF_3$, $AsF_5$, $SbF_3$, $SbF_5$ and mixtures thereof.

In another aspect of the present invention, an apparatus is provided allowing for the gaseous inorganic halide to be purified in an inert, anhydrous environment.

DETAILED DESCRIPTION

Figure 1:
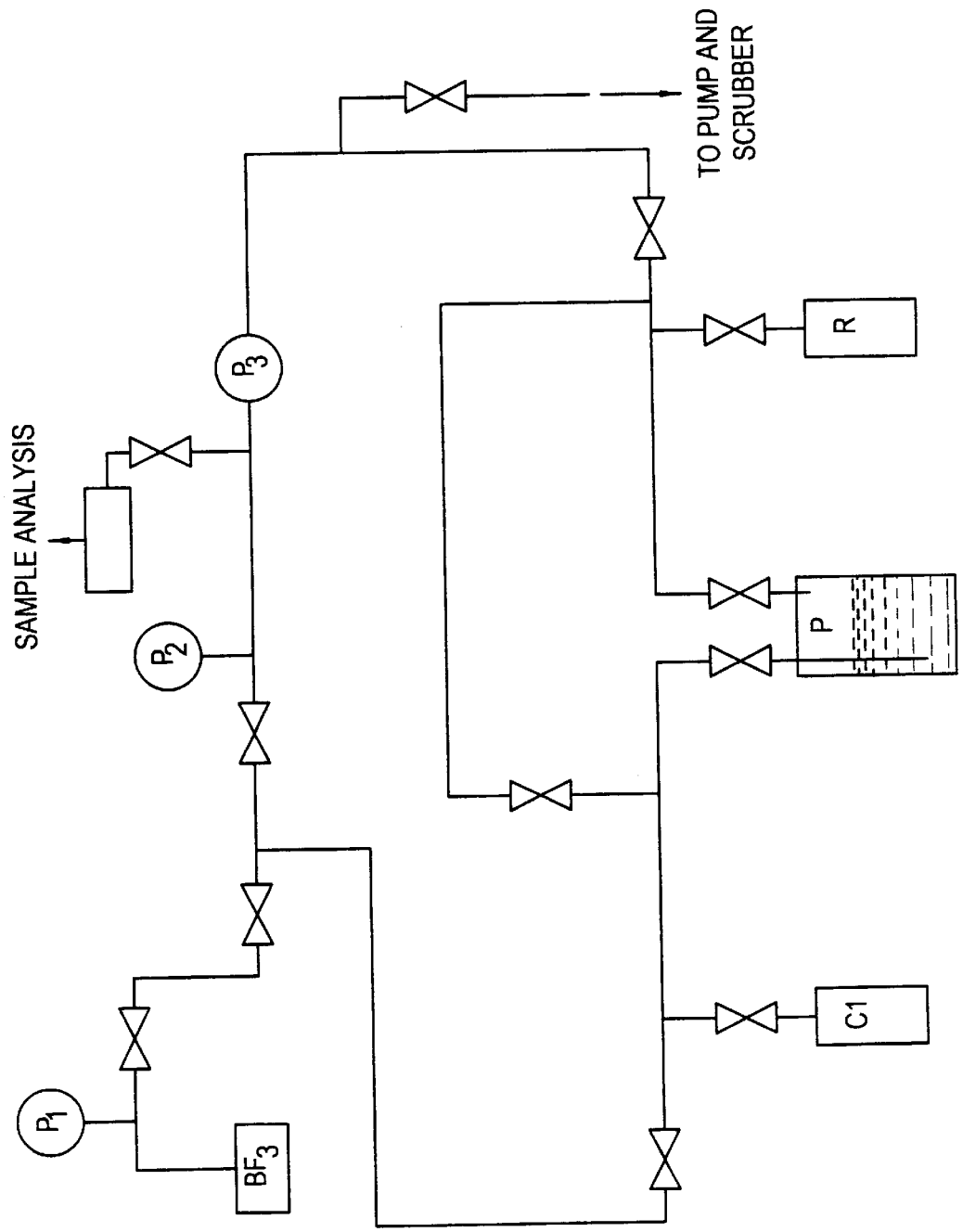
FIG. 1 is a schematic representation of the apparatus used to purify a gaseous inorganic halide according to the present invention.

The present invention provides a method and apparatus for purifying gaseous inorganic halide compounds. The process embodied in the present invention generally provides for the gaseous inorganic halide to be introduced into an inert atmosphere whereby the gaseous inorganic halide is contacted with a reactive substance. The reactive substance may be a metal and optionally an absorbent material both capable of removing impurities. The present invention also provides for the removal of uncondensed gases such as nitrogen, oxygen and others by evacuating or pumping off the gases occupying head space while the inorganic halide is condensed in the liquid or solid phase.

While the present invention provides a method of purifying compounds belonging to the general class of gaseous inorganic halides such as $BF_3$, $SiF_4$, $BCl_3$, $GeF_4$, $PF_3$, $PF_5$, $AsF_3$, $AsF_5$, $SbF_3$, $SbF_5$, and mixtures thereof, $BF_3$ is a preferred compound. The present invention may be used to purify gaseous inorganic halides having any purity grade, however a preferred embodiment of the invention is directed to further purifying an already purified gaseous inorganic halide containing about 1.0 to about 0.5% impurities.

The reactive substances used to purify the gaseous inorganic halides may be any substance capable of sequestering impurities from gaseous inorganic halides. Although this disclosure is not limited by any theory of operation, it is believed that purification is achieved by the action of heating the crude gas, which as a propensity to complex with impurities, and decouple the impurities from the gaseous inorganic halide whereby the free decoupled impurities selectively react with the reactive substance thereby removing them from the gas phase.

The reactive substances used in the present invention may be selected from any ceramic, glass, metallic, semi-metallic material capable of sequestering impurities. In a preferred embodiment of the present invention a reactive metal may be used containing any alkali metal (Group I) including lithium, sodium and potassium, and alkaline earth metals (Group II) including beryllium, magnesium, calcium, strontium and/or barium and alloys. These metals may be either pure or alloys thereof. Such alloys may have Group III and IV metals present; preferred are silicon, aluminum, germanium, boron and/or calcium as the accompanying alloy metal. The preferred metal is lithium or calcium.

The reactive metal may be used in any form to practice the present invention, however forms possessing a large surface area are more preferred. For example, a cut ribbon or foil would have a higher surface area than a cube of equal mass, and therefore the cut ribbon or foil would be preferred. The precise surface area, however, is not critical to the practice of the present invention provided sufficient reactive metal surface is available to react with all or most of the impurities introduced and contacted to the reactive metal. Therefore the amount of reactive metal used is not critical. In preferred embodiments, the amount or loading of the reactive metal will vary according to the form and surface area of the metal and the purity of the gaseous inorganic halide. In one preferred embodiment of the present invention, a molar ratio between about 1:25 of lithium to crude boron trifluoride may be used. In an even more preferred embodiment, a molar ratio of about 1:10 lithium to crude boron trifluoride is used. In another more preferred embodiment, the molar ratio is about 1:0.2 lithium to crude boron trifluoride. In another preferred embodiment of the present invention, an equal molar ratio of lithium to crude boron trifluoride is used.

In one embodiment of the present invention the reactive metal (such as lithium) is used as a fine powder. In other preferred embodiments the reactive metal is provided in a foil, pellet, shot, granule, rod, or sheet. The metal may also be plated or deposited onto or into an inert support. In one preferred embodiment cut lithium foil is placed in a purifier vessel into which the crude gaseous inorganic halide is fed for the purposes of contacting the gas with the metal. In other embodiments of the present invention the reactive metal is packed in a column, fluidized bed, or other flow through apparatus capable of providing an opportunity for the gaseous inorganic halide to contact the reactive metal. The reactive metal may be contacted with the crude gaseous inorganic halide at temperatures sufficient to decouple the impurities from the gas, and thereby cause the reactive metal to react with the impurities of the crude gaseous inorganic halide. In one preferred embodiment of the invention the reactive metal is heated to a temperature between about 25° C. to about 300° C. In a more preferred embodiment the temperature range of the heated reactive metal is between about 50° C. and about 250° C. In a more preferred embodiment of the present invention the reactive metal is heated to a temperature of about 100° C. to about 180° C. whereby 130° C. is the most preferred embodiment where lithium is used as the reactive metal.

The contact, or residence time of the gaseous inorganic halide to the reactive metal will depend upon several factors such as the gaseous inorganic halide being purified as well as its purity. The type of metal and the vessel it is contained in will also effect the contact time. Generally the contact time should be between about 30 seconds to about 30 minutes for batchwise purification. In one preferred embodiment using lithium as a reactive metal, about 5 to about 15 minutes is a suitable contact time, and about 8 to about 10 minutes is most preferable. However, if a constant flow of gas is passed through a column of reactive metal in a steady state, these times may vary depending upon the flow rate of the gas and the amount of reactive metal used. Flow rates of the gaseous inorganic halide used in the present invention where reactive material beds or columns are used may vary according to bed or column configuration. In one preferred embodiment of the present invention flow rates between about 1 ml per minute to about 1000 ml per minute may be used. In another preferred embodiment, the flow rates may be between about 50 ml per minute and about 100 ml per minute. In another preferred embodiment, the flow rates may be between about 100 ml per minute and about 500 ml per minute.

In the present invention, the gaseous inorganic halide also may be contacted with an adsorbant material. Preferred examples of such adsorbant materials are ceramics, organic and inorganic compounds including salts, polymeric materials, metals and supported metal composites and molecular sieves. Molecular sieves are porous structures usually composed of inorganic materials such as aluminum silicates, feldspars and other clay-type materials. Molecular sieves may also be derivitized with organic functional groups. The pore sizes of molecular sieves have a typical range between about 5 and about 10 angstroms.

In a preferred embodiment of the present invention 5A molecular sieves are used (U.O.P. Inc., Des Plains, Ill.). The function of the molecular sieves in the present invention, without being limited to any particular theory, is probably to absorb carbon dioxide and perhaps other impurities. The molecular sieves used in this embodiment of the present invention may be placed in a vessel in line with the apparatus also containing a vessel for the reactive metal. The molecular sieves in one preferred embodiment may be placed in line before the reactive metal. In other preferred embodiments the molecular sieve vessel may be placed after the reactive metal vessel, or alternatively two molecular sieve vessels may be placed before and after the reactive metal vessel line. In one preferred embodiment, the inorganic halide may be contacted with the molecular sieves at temperatures between about −190 to about 0° C. where a more preferred range is between about −80 and about 0° C. In another preferred embodiment, the inorganic halide may be contacted with the molecular sieves for a time between about 1 to 30 minutes. Another preferred contact time range may be between about 5 to about 10 minutes. In either case the crude gaseous inorganic halide is contacted with the molecular sieves along with the reactive metal to produce a purified inorganic halide.

The exact amount of adsorbant material, including molecular sieves, is not critical. In one preferred embodiment, a sufficient amount of 5A molecular sieves is used to adsorb impurities mixed in the crude inorganic halide. In another embodiment of the present invention about 150 g of 5A molecular sieves is used as an adsorbant. Generally, molecular sieves adsorb independently of temperature and pressure, as is known in the art. It is important to note that many adsorbant materials such as molecular sieves should be activated. For the purposes of describing the present invention, activated molecular sieves are pretreated to remove water, adsorbed gases, and other chemicals that may interfere with the adsorption activity during the gaseous inorganic halide purification process of the present invention.

The apparatus used in the present invention as illustrated in FIG. 1, may be any manifold system whereby the crude gaseous inorganic halide can be delivered in an inert and anhydrous atmosphere to the molecular sieve vessel or the reactive metal vessel and ultimately collected in a receiving vessel. The apparatus should be capable of withstanding reduced pressures as well as several atmospheres of pressure due to the fact that the gaseous inorganic halide may be either transferred, distilled or condensed during various stages of the practice of the present invention. The apparatus may also have a means for drawing alloquots of gas for analysis. Such means may be a sample port comprising a resilient septum affixed in line to the apparatus. The apparatus may be composed of various vessels such as glass flasks, ceramic containers, metal containers or gas cylinders, or other typical non-reactive chemical reaction vessels. The vessels may be connected using non-reactive polymeric tubing, metal pipe or tube, or glass pipe or tube. The apparatus may be sectioned off using any type of valve stopcock or clamp depending on the composition of the tubing or piping.

The gaseous inorganic halide is transferred between vessels either by distillation or by pressure difference. For example, the gas may be cryogenically transferred to an empty vessel, as is known in the art, then subjected to a high vacuum to remove uncondensed gases such as nitrogen and oxygen. In a preferred embodiment of the present invention, the distillation may be performed where the gaseous inorganic halide may be condensed at temperatures between about −190 to about −78° C. Afterwards, the condensed gas may be warmed into the gas phase and distilled to another vessel and contacted with either molecular sieves or a reactive material as desired. In a preferred embodiment of the present invention, the gaseous inorganic halide may be warmed to temperatures between about −50 to about −10° C. Once purified, the gas can be cryogenically transferred to a receiving vessel.

The apparatus illustrated in FIG. 1 is only one possible configuration. It is preferable to maintain the vessel at some lower temperature to inhibit desorption of contaminants from the molecular sieve and their subsequent transfer to the purifier (P). Any configuration may be used to transfer and sample the gas as required depending on the number of purification steps used in the present invention. As is known in the art, line and vessel pressures will vary depending upon the configuration of the apparatus, the condensing temperatures, vacuum pump strength and the total volume of the apparatus in the present invention.

In one preferred embodiment the gaseous inorganic halide may be $BF_3$ and the reactive metal may be lithium or an alloy of lithium, and the metal contacting step may be performed at a temperature between about 100° C. and about 180°, followed by a further contacting step with 5A molecular sieves.

EXAMPLES

In the following examples preferred embodiments of the present invention are described. The vessels and purifiers mentioned are illustrated in FIG. 1.

Example I

Commercially available boron trifluoride (8.0 g) was condensed into a vessel C1 containing 5A molecular sieves (50 g) at liquid nitrogen temperature. While the vessel was maintained at liquid nitrogen temperature, the headspace of the vessel was pumped on through a manifold via a vacuum pump to remove uncondensed gases such as nitrogen and oxygen. The valve to the vessel was then closed and the vessel was allowed to come to room temperature. It was cooled again to liquid nitrogen temperature and the headspace evacuated to ensure removal of uncondensed gases. The vessel valve was then closed. Preferably, the vessel should be cooled to a temperature no greater than the melting point temperature of the inorganic halide and maintained at that temperature while being evacuated. The vessel was then brought to dry ice temperature and allowed to rest for several minutes, after which the vessel was allowed to warm to room temperature. 3.3 g of $BF_3$ was collected into the receiver R and was analyzed.

Nitrogen, oxygen, sulfur dioxide and sulfate concentrations all were less than 20 PPM each. Silicon tetrafluoride was measured at 44 PPM. A purifier P vessel lithium metal(4.0 g) was inserted between vessel C1 and the receiver R. The purifier P was heated to 125° C. Boron trifluoride (15 g) from vessel C1 held at 0° C. was transferred to purifier P in five portions. During each transfer, boron trifluoride was in contact with lithium metal for 5 minutes before being collected into the liquid nitrogen cold receiver R. The valve on purifier was closed and the head space of the receiver R was pumped off. A total of 8.5 g boron trifluoride was collected and analyzed. Silicon tetrafluoride was observed to be less than 1 ppm.

The analysis methods used were specific to the impurities of interest. Nitrogen, oxygen, and carbon dioxide were analyzed by gas chromatography. Sulfate and sulfur dioxide impurities were analyzed by ion chromatography and gravimetric methods. Silicon tetrafluoride was analyzed by gas chromatography and photometric evaluation of reduced B-silicomolybdic acid (silicomolybdenum blue) with a detection limit of less than 0.05 mg/L.

Example 2

In Examples 2, and 3, boron trifluoride (99.8%) was used containing the following impurity profile: 2000 ppm of air; 1 ppm of sulfur dioxide; 10 ppm sulfates and 17 ppm of $SiF_4$.

A vessel C1 containing 5A molecular sieves (150 g) was connected in series on the vacuum manifold to a stainless steel container, purifier P, containing lithium metal (4.0 g). The purifier P was evacuated and heated to a temperature between 120 and 130° C. The vessel C1 was cooled with a dry ice bath and the bath was removed. At −20° C., boron trifluoride (22.8 g) from vessel C1 was transferred to the purifier P in five portions by opening the valves on each container and then closing the valve on vessel C1. During each transfer boron trifluoride was in contact with the lithium metal for ten minutes before being collected into the cold receiver stainless steel cylinder R with liquid nitrogen bath. The liquid nitrogen cold receiver was then pumped to remove uncondensed gases. A total of 15.9 g of $BF_3$ was collected. The operating temperature of the purifier is 130° C. Note, for an inorganic halide other than $BF_3$, the temperature of the purifier and the contact time would be adjusted to achieve the optimum purity of the inorganic halide and avoid degradation of the inorganic halide or generation of excessively high temperatures or pressures in the purifier.

The sample from the receiver cylinder R was analyzed. Analysis by gas chromatography showed nitrogen and oxygen present at a total concentration of 6 PPM, carbon dioxide present at 1 PPM, and silicon tetrafluoride at a concentration of 1 PPM. This demonstrates that the process of the present invention is more effective than conventional methods in removing impurities from an inorganic halide. It is particularly effective in removing silicon tetrafluoride from boron trifluoride.

Example 3

In this example another vessel R1 with 5A molecular sieves (150 g) was added in series between purifier P and final receiver R. Approximately 61 grams boron trifluoride was condensed into vessel C1 at liquid nitrogen temperature and the head space of the vessel was evacuated. The valve to the vessel was closed and the vessel was allowed to warm to room temperature. It was cooled again with liquid nitrogen and the uncondensed gases were pumped off. The purifier P was heated to about 125° C. The vessel C1 was allowed to warm up and the boron trifluoride from it was transferred in several steps to purifier P. In each step boron trifluoride was in contact with hot lithium (4.0 g) in purifier P for about 5 minutes before it was transferred into the vessel R1 containing 5A molecular sieves and cooled to liquid nitrogen temperatures. After the desired amount of boron trifluoride from C1 was passed through the purifier, valves on purifier P were closed. The cold vessel R1 was then pumped on to remove any uncondensed gaseous impurities. The vessel R1 was then allowed to warm up to about 0° C. while transferring the boron trifluoride from it into the liquid nitrogen cold receiver R. The valve on the vessel R1 was closed and head space of receiver R was pumped off. A total of about 23 grams of boron trifluoride was collected in receiver R and was analyzed. The combined concentrations of carbon dioxide, sulfur dioxide, nitrogen and silicon tetrafluoride impurities were observed to be less than 7 PPM.

Although the invention herein has been described with reference to particular embodiments, it is to be understood that these embodiments are merely illustrative of the principles and applications of the present invention. It is, therefore, to be understood that numerous modifications may be made to the illustrative embodiments and that other arrangements may be devised without departing from the spirit and scope of the present invention as defined by the appended claims.

What is claimed is:

1. A process for purifying gaseous inorganic halides comprising contacting a crude gaseous inorganic halide with a substance comprising a reactive material, wherein the reactive material reacts with impurities in the crude gaseous inorganic halide to thereby remove the impurities from the gaseous inorganic halide, and wherein said gaseous inorganic halide is selected from the group consisting of $BF_3$, $BCl_3$, $GeF_4$, $PF_3$, $PF_5$, $AsF_3$, $AsF_5$, $SbF_3$, $SbF_5$, and mixtures thereof.

2. A process according to claim 1 wherein the reactive material comprises a reactive metal.

3. A process according to claim 2 wherein the reactive metal has a high surface to volume ratio.

4. A process according to claim 2 wherein the reactive metal comprises an alkali metal, alkaline earth metal, or an alloy of such a metal with a Group III or Group IV element.

5. A process according to claim 2 wherein the reactive metal is selected from the group consisting of lithium and alloys of lithium with one or more of the elements silicon, aluminum, germanium, boron, and calcium.

6. A process according to claim 2 wherein the reactive metal is selected from the group consisting of calcium and alloys of calcium with one or more of the elements silicon, aluminum, germanium, and boron.

7. A process according to claim 1 wherein the contacting step is performed at a temperature between about 25 and about 300° C.

8. A process according to claim 7 wherein the crude gaseous inorganic halide is contacted with the reactive material for a time between about 0.5 minutes to about 30 minutes.

9. A process according to claim 7 wherein the crude gaseous inorganic halide is contacted with the reactive material for a time between about 5 minutes to about 15 minutes.

10. A process according to claim 7 wherein the crude gaseous inorganic halide is contacted with the reactive material for a time between about 8 minutes to about 10 minutes.

11. A process according to claim 1 wherein the crude gaseous inorganic halide is purified by distillation over an adsorbent material prior to being contacted with the reactive material.

12. A process according to claim 11 wherein the adsorbent material is a molecular sieve.

13. A process according to claim 11 wherein the adsorbent is a 5A molecular sieve.

14. A process according to claim 11 wherein the said distillation step includes condensing the crude inorganic halide at or below its melting point temperature and pumping off the uncondensed gases.

15. A process according to claim 1 wherein the process further comprises purifying the gaseous inorganic halide by distillation after being contacted with the reactive material.

16. A process according to claim 15 wherein said distillation is conducted over an adsorbent material.

17. A process according to claim 16 wherein the adsorbent material is a molecular sieve.

18. A process according to claim 15 wherein the said distillation step is conducted at a temperature at or below the melting point of the inorganic halide and the uncondensed gases are optionally pumped off.

19. A process according to claim 1 wherein said contacting step is performed at a consumption location of said purified gaseous inorganic halide.

20. A process for purifying $BF_3$ comprising contacting the crude $BF_3$ with a reactive metal selected from the group consisting of lithium and alloys of lithium with one or more of the elements silicon, aluminum, germanium, boron, and calcium at a temperature above room temperature.

21. A process according to claim 20 wherein said contacting comprises passing the crude $BF_3$ through a column packed with said reactive metal.

22. A process according to claim 20 wherein the reactive metal has a high surface to volume ratio.

23. A process according to claim 20 wherein the contacting step is performed at a temperature between about 25 and about 300° C.

24. A process according to claim 23 wherein the contacting step is performed at a temperature between about 50° C. and about 250° C.

25. A process according to claim 23 wherein the crude $BF_3$ is contacted with the heated reactive metal for a time between about 0.5 minutes to about 30 minutes.

26. A process according to claim 23 wherein the crude $BF_3$ is contacted with the heated reactive metal for a time between 5 minutes and about 15 minutes.

27. A process according to claim 23 wherein the impure $BF_3$ is contacted with the heated reactive metal for a time between about 8 minutes to about 10 minutes.

28. A process according to claim 20 wherein the process further comprises purifying the crude $BF_3$ by distillation over an adsorbent material prior to being contacted with the heated reactive metal.

29. process according to claim 28 wherein the adsorbent material is a molecular sieve.

30. A process according to claim 28 wherein the adsorbent material is a 5A molecular sieve.

31. A process according to claim 28 wherein the said distillation step is conducted at temperatures at or below the melting point of the $BF_3$ and optionally pumping off the uncondensed gases.

32. A process according to claim 29 or claim 30 wherein the $BF_3$ is condensed at temperatures between about −78° C. and about −190° C. during the said distillation step and the uncondensed gases are optionally pumped off.

33. A process according to claim 29 or claim 30 wherein the $BF_3$, after being contacted with the adsorbent material, is held at a temperature between about −190 to about 0° C. before contacting it with the reactive metal.

34. A process according to claim 20 further comprising the step wherein the $BF_3$ is purified by distillation after being contacted with the reactive metal.

35. A process according to claim 34 wherein said distillation after contact with the heated reactive metal includes distillation over an adsorbent material.

36. A process according to claim 35 wherein the adsorbent is a molecular sieve.

37. A process according to claim 34 wherein, in said distillation step the $BF_3$ is condensed at a temperature at or below its melting point temperature and the uncondensed gases are pumped off.

38. A process according to claim 20 further comprising the step of utilizing the purified $BF_3$ at a consumption location, said contacting step being performed at said consumption location.

39. A process for purifying boron trifluoride comprising the steps:

(a) condensing crude boron trifluoride at liquid nitrogen temperature in a vessel;

(b) pumping off any uncondensed gas;

(c) warming the condensed boron trifluoride to room temperature;

(d) repeating the condensing and pumping steps (a), (b) and (c) at least one additional time;

(e) contacting the boron trifluoride with molecular sieves in a vessel cooled to a temperature of about −80 to −20° C.;

(f) contacting the boron trifluoride with lithium heated to a temperature of between about 100 to about 180° C.; and (g) optionally collecting the boron trifluoride into a vessel cooled to liquid nitrogen temperature.

40. A process according to claim 1 wherein said gaseous inorganic halide is $BF_3$.

* * * * *